UNITED STATES PATENT OFFICE.

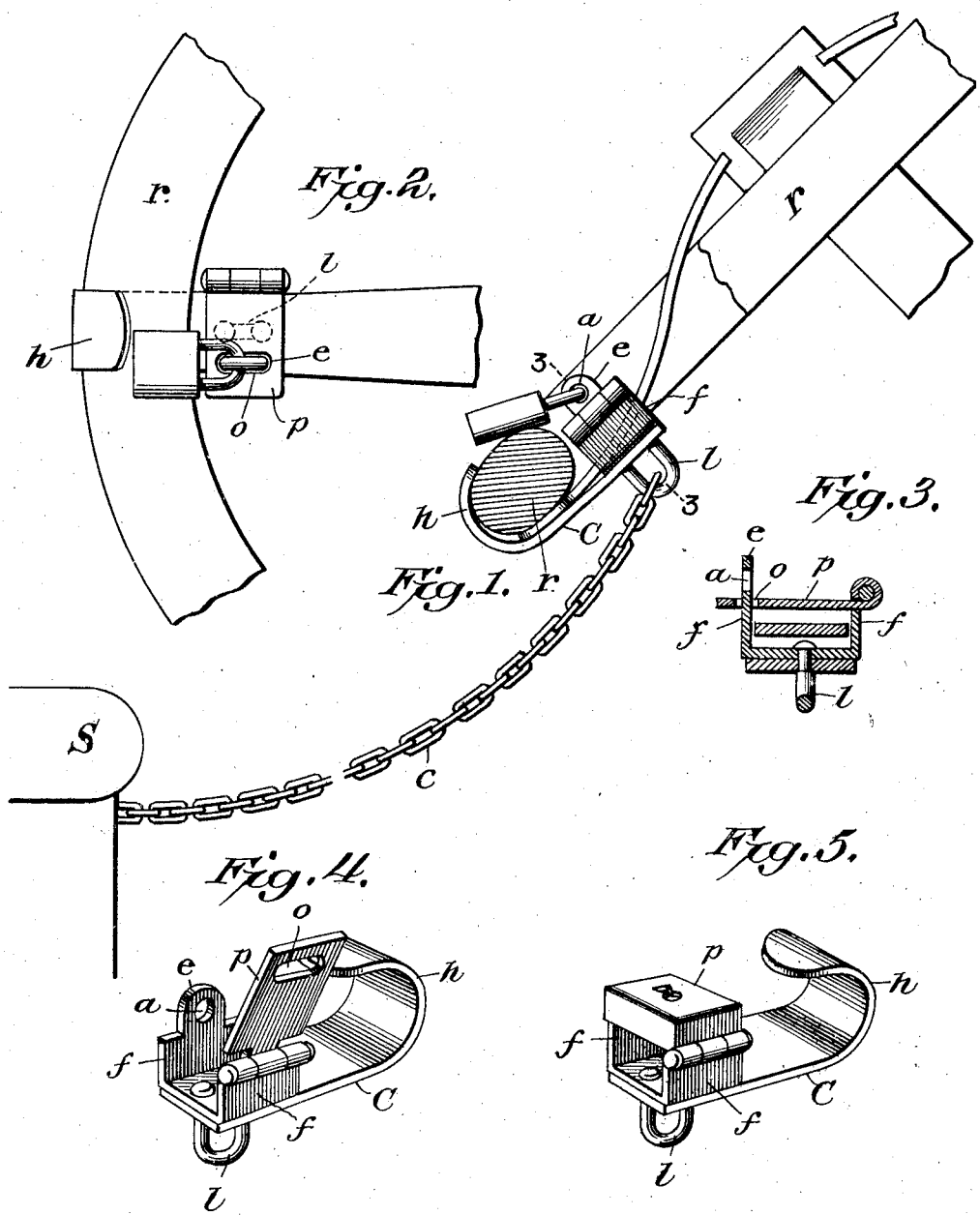

NATHAN A. KAERCHER, OF YOUNGSTOWN, OHIO.

AUTOMOBILE-LOCK.

1,361,264.

Specification of Letters Patent.

Patented Dec. 7, 1920.

Application filed March 3, 1919. Serial No. 280,434.

*To all whom it may concern:*

Be it known that I, NATHAN A. KAERCHER, citizen of the United States, residing at Youngstown, in the county of Mahoning and State of Ohio, have invented certain new and useful Improvements in Automobile-Locks, of which the following is a specification.

This invention relates to automobile locks, and consists of means for locking the steering wheel to some portion of the body frame of the machine to prevent rotation of the wheel, the object being to provide a cheap, economic and efficient device for that purpose.

With this object in view, the invention resides in the novel formation or construction of the clip member of the locking device which makes it possible to include both the rim and a spoke of the steering wheel within the grasp or embrace of a detachable device.

Figure 1 is a fragmentary view or elevation of an automobile, showing the steering wheel and seat of the machine with the locking device attached; Fig. 2 is a fragmentary top plan view of the steering wheel, showing the manner in which the lock embraces both the rim and a spoke of the wheel; Fig. 3 is a sectional view on line 3—3 Fig. 1; Fig. 4 is a view in perspective of my complete locking device; and Fig. 5 is a similar view of a modified form of my device designed to be used in connection with a lock casing having suitable locking mechanism, in lieu of the locking plate and pad-lock.

The clip C of the device is formed by first bending one end of a metal bar into substantially a U shaped formation, forming the hook member $h$, and then providing the opposite or open end of the bar with a pair of oppositely disposed upstanding lugs or flanges $f$—$f$, forming a channel running at right angles with the channel formed by the hook member $h$.

To the upper end of one of these flanges is swingingly mounted the locking plate $p$, provided at its free or outer end with the hole or opening $o$. The upper end of the opposite flange carries the elongated portion $e$ to be embraced by the opening $o$, and provided with the opening $a$ to receive the stem of the pad-lock.

While the drawing shows the flanges $f$—$f$ as formed integrally, but separately from the bar, and then secured to the bar by means of the loop $l$ serving as rivets, it is obvious that they may be formed integrally with the bar by stamping the entire blank formation out of the metal sheet at one stroke of the die.

The device is secured to any desired portion of the body frame of the machine (shown in the drawing as secured to the seats) by means of the chain $c$, one end of which is fastened to the loop $l$ and the other end to the frame of the machine.

With this construction or formation the hook member $h$ may be brought into engagement with the rim of the wheel, with the flanges $f$—$f$ embracing one of the spokes, after which the locking plate $p$ may be swung into locking engagement with the point $e$ and the pad-lock inserted and locked.

As shown in Fig. 5, the device may also be used in connection with a lock casing having suitable locking mechanism, instead of with the locking plate as shown in the other figures, and as described in the specifications.

I claim—

1. In a device for locking automobiles, a bar having a hook member at one end to engage the rim of the steering wheel, and means for locking the other end around a spoke of the wheel, whereby the device may be securely attached to the rim and spoke of the wheel when desired, and readily detached when desired, and a flexible connection between the device and the body frame of the automobile.

2. In a device for locking automobiles, a bar having a hook member at one end and at the other end a pair of oppositely disposed flanges, a locking plate swingingly mounted upon one of said flanges and adapted to come into locking engagement with the other flange, whereby the device may be securely attached to the rim and spoke of the steering wheel when desired, and readily detached when desired, and a flexible connection between the device and the body frame of the automobile.

3. In a device for locking automobiles, a bar having a hook member at one end and at the other end a pair of oppositely disposed flanges, a locking case fitted with suitable locking mechanism swingingly mounted upon one of said flanges and adapted to come into locking engagement with the other flange, whereby the device may be securely attached to the rim and spoke of the steering wheel when desired, and readily detached when desired, and a flexible connection between the device and the body frame of the automobile.

In testimony whereof I hereunto affix my signature in the presence of two witnesses.

NATHAN A. KAERCHER.

Witnesses:
JOHN A. FITHIAN,
CLARA HINDSON.